United States Patent [19]

Wagener et al.

[11] 4,427,933
[45] Jan. 24, 1984

[54] LOAD COMMUTATED INVERTER GATING CONTROL SYSTEM AND MOTOR DRIVE WITH SUCH CONTROL SYSTEM

[75] Inventors: Paul W. Wagener, Alden; Loren F. Stringer, Clarence, both of N.Y.

[73] Assignee: Westinghouse Electric Corp., Pittsburgh, Pa.

[21] Appl. No.: 315,600

[22] Filed: Oct. 30, 1981

[51] Int. Cl.³ ............................................. H02P 5/40
[52] U.S. Cl. ................................ 318/711; 318/345 E; 318/809
[58] Field of Search ............ 318/341, 345 E, 807–881, 318/711

[56] References Cited

U.S. PATENT DOCUMENTS 4,090,116 5/1978 Lippitt ............................ 318/345 E

OTHER PUBLICATIONS

Le-Huy et al., "Microprocessor Control of a Current-Fed Motor Drive," 1979IAS79:29A, pp. 873–880.

Primary Examiner—David Smith, Jr.
Attorney, Agent, or Firm—C. M. Lorin

[57] ABSTRACT

A synchronous motor drive includes an inverter gating control system using three counters wherein two counters respond to 180° apart zero crossings for providing units of time in terms of clock units, and the third counter is at a computed time interval preset with a count to be counted down to derive the remaining time which is to elapse until a predetermined firing angle is reached, at which time firing of the thyristor of the inverter is triggered.

6 Claims, 4 Drawing Figures

LOAD COMMUTATED INVERTER GATING CONTROL SYSTEM AND MOTOR DRIVE WITH SUCH CONTROL SYSTEM

BACKGROUND OF THE INVENTION

The present invention relates to a digital gate pulse generator for the control of thyristors, to static inverter and/or converter control with such a digital gate pulse generator, and to control and regulation of a motor drive, in particular of the synchronous motor type, embodying static control through such a digital gate pulse generator.

More specifically, the invention relates to a digital gate pulse generator which is particularly adapted to microprocessing, and which can be integrated in the microprocessing treatment of a regulation and control loop through an inverter, or converter system, as can be formed for speed and torque adjustment in a motor drive. The digital gate pulse generator according to the present invention is particularly applicable to a current-fed inverter and control of the thyristors thereof which are load commutated.

The invention lends itself particularly to thyristor control under varying frequency on the AC lines and is therefore well adapted to speed control of a synchronous motor drive as well as to power conversion through static-controlled frequency changers.

The invention will be described for illustration purpose in the context of a current-fed static-controlled synchronous motor drive. The digital pulse generator according to the invention is part of a control loop including the thyristors of the control system of the motor drive. In contrast to the voltage-fed type, in a current-fed motor drive system the amplitude and the frequency of the alternating current that excites the stator windings of the motor are the control parameters. Typically, the motor is energized by an inverter formed of a plurality of controllable electric valves or switching devices (e.g., thyristors) of the type having the ability to hold OFF forward voltage until turned ON by a pulse from a gate pulse generator. The amplitude of alternating current supplied to the motor can be regulated or controlled as desired by adjusting the average magnitude of voltage impressed on the DC side of the inverter, while the frequency of the current is controlled by appropriately varying the switching frequency of the thyristors of the inverter.

A variable speed motor drive involves frequency adjustment of the power supply to the motor in order to regulate speed. In such a motor drive, gating of the static switches which determine the motor power supply parameters at any speed must be operable at varying frequency and through a range extending down to zero motor speed.

In the prior art systems embodying thyristors which are naturally commutated, the firing angle of the thyristors is controlled by reference to a time wave related to the voltage applied to the main electrodes of the thyristor to be turned ON, at any given moment. The generation of such a time wave reference is disclosed, typically, in U.S. Pat. Nos. 4,173,722 and 4,028,609 of R. L. Detering. There, however, only small variations of frequency are contemplated. Therefore, a digital pulse generator uses a digital counter synchronized in phase and frequency with the fundamental voltage sine wave, and a time wave reference is derived with which to determine the firing angle in relation to a digital counter. A phaselocked loop provides compensation for any change in the fundamental frequency of the AC power supply.

When the motor drive includes a synchronous motor supplied by an inverter, variable speed control through firing angle adjustment of the inverter thyristor is directly related through the time wave reference to the voltage and frequency parameters of the rotating vector derived on the stator, or the rotor of the machine, since there is an inherent synchronism between the two under steady conditions of operation. Accordingly, it has been proposed to use the motor terminal voltage to synchronize the inverter triggering pulses. See H. Le-Huy, A. Jakubowicz and R. Perret, "A Self-Controlled Synchronous Motor Drive Using Terminal Voltage-Sensing," in 1980 IEEE, pp. 562-569. There, the polarity and zero-crossings of the machine voltages are detected by means of terminal sensors from which is derived a speed signal as well as a rotor position signal. Although this prior art technique has been intended to be used as part of a microprocessor-based control system, it lacks the advantage of an all-digital treatment of the information. In particular, three voltage signals are derived and a speed signal is obtained therefrom by a frequency multiplier, the operating frequency range depending upon a counter length, the frequency of a clock and a chosen multiplying factor. These four signals are used to provide a controllable delay angle between the inverter triggering pulse and the machine voltages. Based on linear digital ramp technique the angle control word issued by a microcomputer is converted to a corresponding delay angle. Typically, the 8-bit input control word used there contains mode operation as well as delay-angle information. These are typically defined by the first bit and the remaining 7 bits, respectively, as explained in H. Le-Huy, R. Perret and D. Roye, "Microprocessor Control of a Current-Fed Synchronous Motor Drive" in 1979 IAS 79:29A pp. 873-880. Pulse generation, which is to be implemented either by software or by hardware, is also shown to use a single processor and hardwired logic circuits to convert the CPU commands to appropriate triggering pulses for the converter.

Another approach to firing angle determination and implementation within a control system using microprocessor technique is found in "Digitally Controlled Thyristor Source" by Guy Olivier, V. R. Stefanovic and Mohamed Akhtar Jamil in IEEE 1979, Vol. 1ECI-26 No. 3, August 1979, pp. 185-191. There, the transfer characteristic of a sixpulse thyristor bridge is used and a linear transfer relation between the control signal and the output voltage is sought through a PROM containing a table of an arc cosine curve. The SCR firing pulses are delayed by a time period in accordance with a signal derived from a PI controller in a closed-loop, and the output of the PI controller is fed into the linearization PROM memory which gives a digital equivalent of the desired firing angle. Each time a zero-crossing is detected in the bridge input voltage, one of two counters is started counting up until its output becomes equal to or larger than the desired firing angle, and a firing signal is sent to a ring-counter. This technique is more like that with the aforementioned Detering patents since the problem involved here, with a constantly varying frequency, is not encountered.

Microprocessor-controlled speed regulation in motor drives have been used with motor drives. See for instance the following papers:

"Microprocessor-Controlled Fast-Response Speed Regulator For Thyristorized Reversible Regenerative DCM Drives" in IECI 78 Proceedings—Industrial Applications of Microprocessors, March 20-22, 1978, pp. 216-221 by Kenzo Kamiyama, Azusawa and Miyahara.

"Microprocessor Controlled Inverter-Fed Synchronous Motor Drive" by W. Richter, pp. 161-163, 2nd International Conference on Electrical Variable-Speed Drives, 25-27 September 1979, IEEE Power Division (London).

G. A. Tendulkar, "Measurement of Speed, Position and Acceleration of Electrical Drives in Microprocessor-Based Control System" pp. 171-175, 2nd International Conference IEEE, London, September 1979.

"Control of DC Drives by Microprocessors" by E. Schneider, pp. 603-608, IFAC Symposium on Control in Power Electronics and Electrical Drives by W. Leonhard, Dusseldorf, 1978.

"Design of An Optical Autoadaptive Current Loop for DC Motor Realization with a Hybrid Device Including a Microprocessor" by A. Oumamar, T. P. Louis and A. El-Hefnawy, IFAC Symposium, Dusseldorf, 1978.

The Schneider and Kamiyama papers, for instance, are involved with DC motor drives. Therefore they do not call for a direct derivation of an electrical angle related to rotor positioning and independently of speed, e.g., of frequency.

SUMMARY OF THE INVENTION

The invention provides for the repeated computation of the firing angle with the use of a microprocessor for the respective thyristors to be turned ON in an inverter, such firing angle computation being independent of the AC frequency at the thyristor terminals and dispensing from the use of any shaft position encoding device when a synchronous motor drive is involved.

Three counters are run from a common clock, two counters being combined to provide a unit count representative of electrical degrees on the AC terminals in relation to two consecutive zero-crossings of the AC voltage at said AC terminals, the third counter being initiated at a chosen instant to count the number of electrical degrees ($t_3$) remaining in the phase of a thyristor "next" to be fired up to the total number of electrical degrees defining a predetermined firing angle ($\alpha_n$).

The computation of such remaining number ($t_3$) of electrical degrees is based upon the computed operative phase in electrical degrees ($\phi$) for the "next" thyristor relative to the zero-crossing of the line phase synchronized voltage and to the count ($t_1$) of electrical degrees required from the computed phase to reach ninety electrical degrees from said line phase synchronized voltage zero-crossing.

DETAILED DESCRIPTION OF THE INVENTION

Figure 1:
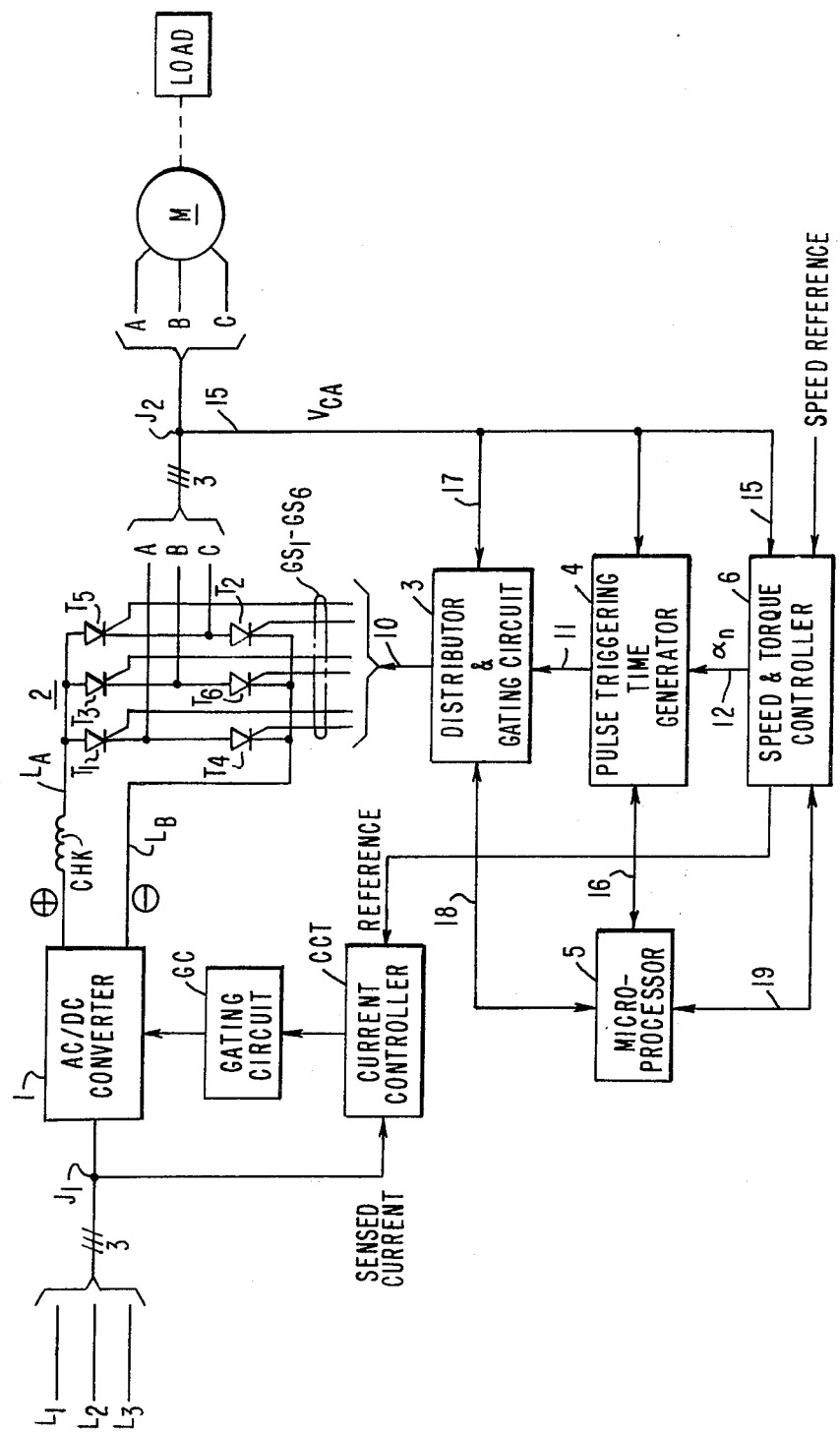
FIG. 1 is a schematic representation of the synchronous motor drive system according to the present invention.

Referring to FIG. 1, a synchronous motor drive control system illustrates in block diagram the preferred embodiment of the invention.

The three-phase, 1640 volts, 60 Hz power supply ($L_1$, $L_2$, $L_3$) is converted into a three-phase (A, B, C) variable frequency ($f_n$) power supply applied to a synchronous motor M coupled to a load. This conversion is achieved by the conventional combination of an AC/DC converter 1, a DC link including a choke CHK and an inverter 2. The AC/DC converter 1 is gated by a gating circuit GC which is controlled by a current controller CCT which is itself responsive to a feedback signal derived from a current sensor at junction $J_1$ at the input of the converter, and to a current reference provided by the speed and torque controller 6 of the motor drive. The inverter typically may include six thyristors $T_1$-$T_6$ mounted in a bridge across the DC link, half of them in relation to the positive polarity terminal $L_A$, the other half in relation to the negative polarity terminal $L_B$, with three output phases A, B, C connected to the motor M.

The invention pertains to the timely generation of gating pulses on lines 10 ($GS_1$-$GS_6$) to the thyristors of the inverter, so as to establish the proper firing angles which determine the operating condition of the motor, irrespective of the frequency $f_n$.

The distributor and gating circuit 3 applies on the various channels $GS_1$-$GS_6$ the firing pulses at the desired firing angle $\alpha_n$ when timely triggered on line 11 by the pulse triggering time generator 4 according to the present invention. A speed and torque controller 6 is also provided for establishing and regulating the various parameters of the motor drive, such as speed, voltage, frequency, torque, power factor, start-up, acceleration, . . . Thus, the speed and torque controller receives on line 14 a speed reference and on line 15 the line phase voltage $V_{CA}$. A microprocessor 5 is associated via line 16 with time generator 4 and via bus lines 19 with speed and torque controller 6 for the repeated computation of $a_n$ within controller 6 and of the exact time which will elapse within the firing angle $\alpha_n$ until the firing instant is reached within circuit generator 4. The firing angle $\alpha_n$ required at any given time for thyristor $T_n$ of rank n in the succession of thyristors T1-T6 is provided in degrees as an input on line 12 to the pulse triggering time generator 4. It is the task of microprocessor 5 and pulse triggering time generator 4 to generate on line 11 to gating circuit 3 a triggering pulse with the exact retardation prescribed by $\alpha_n$, as will be explained now by reference to the curves of FIG. 2 and the block diagram of FIG. 3. The microprocessor also controls via bus lines 18 the control and distribution of the gating pulse to the proper thyristor by circuit 3.

Figure 2:
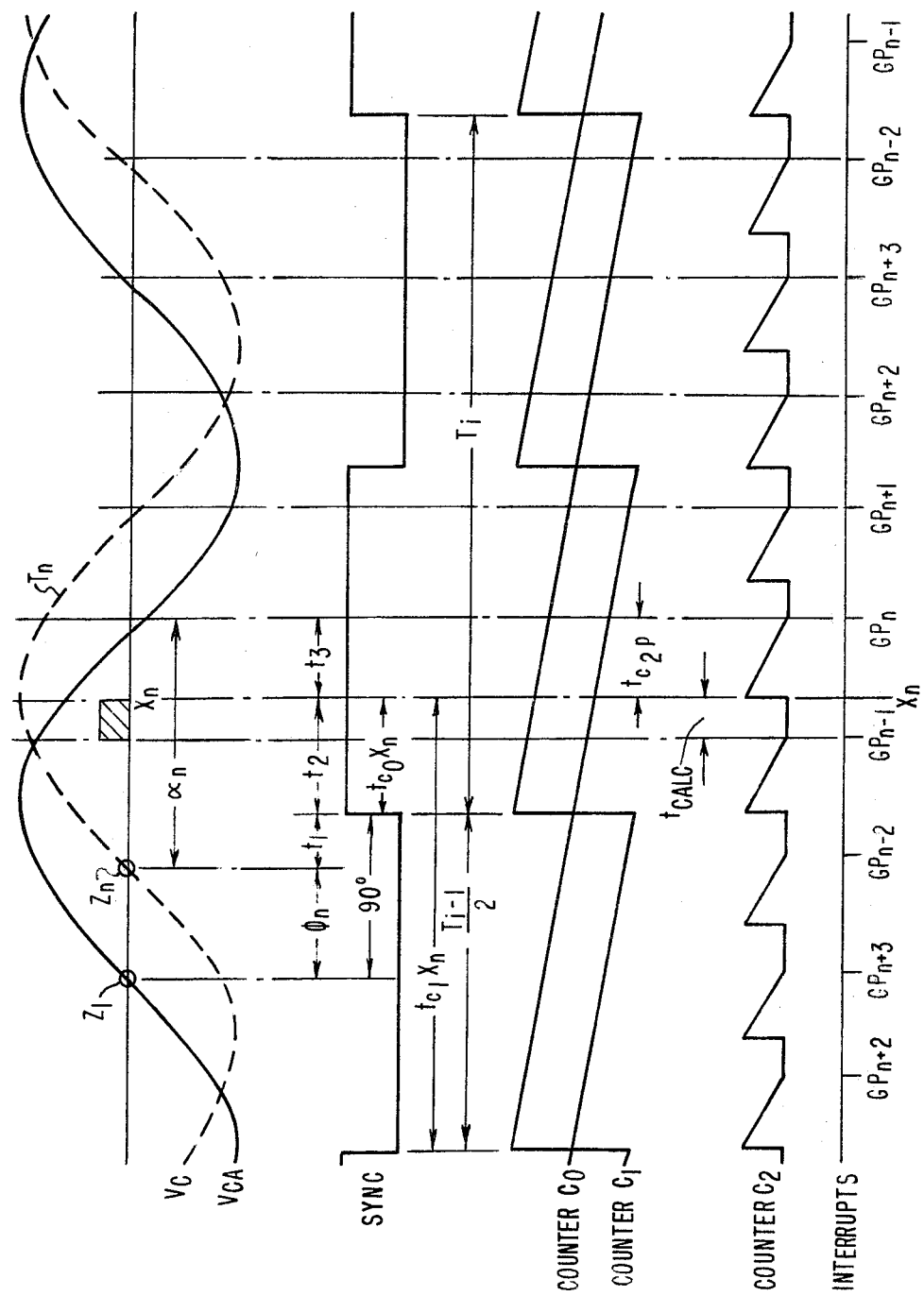
FIG. 2 illustrates with curves the operation of the three counters which are part of the gating system of FIG. 1.

FIG. 2 shows in solid line on a time axis the line-to-line voltage $V_{CA}$ as measured at junction $J_2$ (see FIG. 1) between inverter 2 and the motor M across two phases C and A. In a constant or quasi-constant frequency situation, curve $V_{CA}$ would be used as a time wave reference and from its zero-crossing $Z_1$ the firing angle $\alpha_n$ would be determined for firing any particular thyristor, such as T1–T6, in succession. However, since the frequency $f_n$ of the motor is essentially variable over a wide range, the time axis does not provide a direct reference to electrical degrees. An analog, or digital, ramp phaselocked to the line could not be used in the gate pulse generator, as in the aforementioned Detering patents, because phase-locked loops will not operate reliably over such a wide range where the frequency changes rapidly. As a matter of fact, the Detering technique could be used to control the thyristors of the AC/DC converter 1, since the frequency is constant there, except for some automatic correction for small frequency changes. Not so with the inverter 2 in the context of a variable speed synchronous motor M. FIG. 2 shows also the commutating voltage, in dotted line, which is applicable to the thyristor $T_n$ which is "next" to be fired. For the sake of clarity, the other commutating voltages are not represented, while the gating pulses are shown to occur at $GP_{n-2}$ for the thyristor of $(n-2)$ order, $GP_{n-1}$ for thyristor $T_{n-1}$ at present in conduction, $GP_n$ being the gating pulse at $\alpha_n$ firing angle for the thyristor $T_n$ which is "next". Similarly the future gating pulses are $GP_{n+1}, GP_{n+2} \ldots GP_{n-1}$ in a ring fashion.

It is observed that between each thyristor in succession there is a phase shift $\phi_n = 60°$ in the example shown in FIG. 1 of six thyristors T1–T6. However, $\phi_n$ in general is also affected by any phase angle shifts introduced by the sensing circuits when attempting to measure directly at point J the line-to-line voltage. Another cause of small error is introduced by the subtransient reactances in the motor, which are affected by the reactances of the windings, the armature current, the motor speed, and the field current. These "errors," added when ascertaining $\phi_n$, can be determined and/or calculated. With this understanding it will be assumed hereinafter that $\phi_n$ is free from such "errors" and, in the particular example of FIG. 1, it is understood that $\phi_1, \phi_2, \phi_3, \ldots$ will be zero, 60°, 120° ... in the successive order of the thyristors. It is apparent that the successive values of $\phi_{n-2}, \phi_{n-1}, \phi_n, \phi_{n+1}, \ldots$ are known and may be considered as passing from negative through zero to positive values while going from one thyristor to the next.

With this understanding, for thyristor $T_n$, for instance as shown in FIG. 2, the firing angle $\alpha_n$ from zero-crossing $Z_n$ on the commutating voltage curve, is a composite of time interval $t_1$, time interval $t_2$ and time interval $t_3$, which time intervals will be explained hereinafter. Also, the firing instant $GP_n$ for thyristor $T_n$ is at $(90° + t_2 + t_3)$ from zero-crossing $Z_1$ of the line-to-line voltage $V_{CA}$, while $(\phi_n + t_1) = 90°$.

Figure 3:
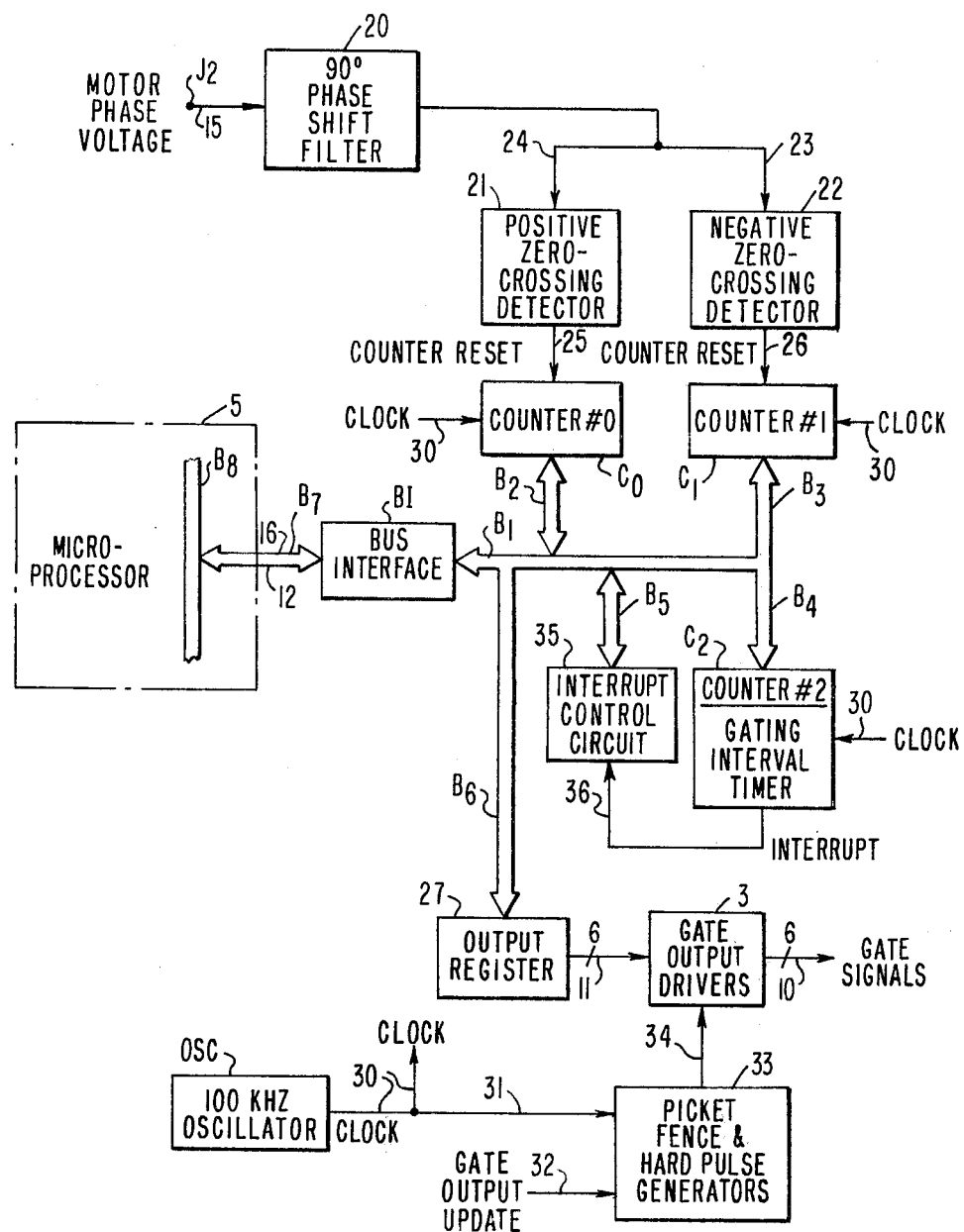
FIG. 3 shows in block diagram the insertion of the three counters of FIG. 2 within the gating system of FIG. 1.

Referring to FIG. 3, line 15 from junction $J_2$ where the line-to-line voltage $V_{CA}$ is sensed, goes to a 90° phase shifter 20 providing on lines 23, 24 a signal which is at 90° phase shift to curve $V_{CA}$. A zero-crossing detector 22 provides a negative zero-crossing indicative signal on line 26, and a zero-crossing detector 21 provides a positive zero-crossing indicative signal on line 25, in response to the outputs 23, 24 from filter 20. The line SYNC signal of FIG. 2 illustrates the opposite states which mark such positive and negative zero-crossing points as detected on lines 25 and 26. Upon positive zero-crossing, a first counter $C_O$ is reset by line 26, while 180° later, e.g., upon the negative zero-crossing, a second counter $C_1$ is reset by line 25. Each timer is counting under a clock signal on line 30 from an oscillator OSC, typically at 100 KHz. Therefore, the SYNC signal of FIG. 2 represents 180° time intervals in units of time (TIME CLK) which last 1/100 millisecond = 10.0 µsec. On the other hand $\phi_n$ and $\alpha_n$ are known in electrical degrees. It is the purpose of the present invention to convert all units into a basic unit which is independent of frequency by converting all "TIME CLK" units into degrees. Since $T_i$, the period in units of time of the SYNC signal corresponds to 360°, t in degrees is:

$$t(\text{degrees}) = t(\text{time}) \times (360°/T_i)$$

where t (time) is in clock units.

Counters $C_0$ and $C_1$ count from the same initial value when reset and, under the same clock signal of line 30, they count at the same rate. They start, however, 180° apart. Therefore:

$$|t°_{c0} - t°_{c1}| = 180°$$

where $t°_{c0}$ and $t°_{c1}$ are counter values converted in degrees. Also $$|t_{c0} - t_{c1}| = T_i/2 \tag{1}$$

where $t_{c0}$ and $t_{c1}$ are in clock units (TIME CLK).

At any moment, the difference between counters $C_0$ and $C_1$ provides a count representing 180° in clock signal unit, and counter $C_0$ beyond the positive crossing detecting point is in fact counting $t_{c0xn}$ in clock signal units, the instantaneous value of time interval $t_2$ $$t_2 = t_{c0xn} \tag{2}$$

Therefore, at such instant $X_n$ (see FIG. 2), it is well known that a time interval $t_3$ remains until the total number of degrees $\alpha_n$ has been reached on the commutating voltage curve. $\phi_n$ is known for thyristor $T_n$, and $t_1$ is known since it is $(90° - \phi_n)$. Thus, at instant $X_n$ the count of $t_{c2p} 32 \, t_3$ can be determined as follows:

$$t_{c2p} = \alpha_n \left(\frac{T_i}{360°}\right) - (t_1 + t_2) \tag{3}$$

where after equation (1) and (2)

$$t_1 = (90° - \phi_n)\frac{T_i}{360°} = (90° - \phi_n)\frac{2|t_{c0xn} - t_{c1xn}|}{360°}$$

Then, at instant $X_n$ $$t_{c2p} = (\alpha_n - 90° + \phi_n)\frac{2|t_{c0xn} - t_{c1xn}|}{360°} - t_{c0xn}$$

$$t_{c2p} = \left(\frac{\alpha_n}{180°} - \frac{1}{2} + \frac{\phi_n}{180°}\right)|t_{c0xn} - t_{c1xn}| - t_{c0xn}$$

Binary 2's complement fractional rotation has been chosen for performing the necessary mathematical calculations in the microprocessor (typically, the sixteen bit word includes the sign and 15 bits with the binary point just to the right of the sign bit). Thus, $\frac{\alpha_n}{180°} =$ fraction, from gate reference controller, where 7FFFF (representing full scale) gives 180° and 00004 (representing zero) gives 0° gating;

whereas:

-continued $$\frac{\phi_n}{180°} - \tfrac{1}{2} = \begin{array}{l}\text{constant which is fixed for any gate pair.}\\ \text{This constant will vary from } -\tfrac{1}{2} \text{ to}\\ +1\tfrac{1}{2}, \text{ where } +1 = 7FFF4, \text{ if } 0° \leq \phi_n \leq 360°.\end{array}$$

Figure 4:
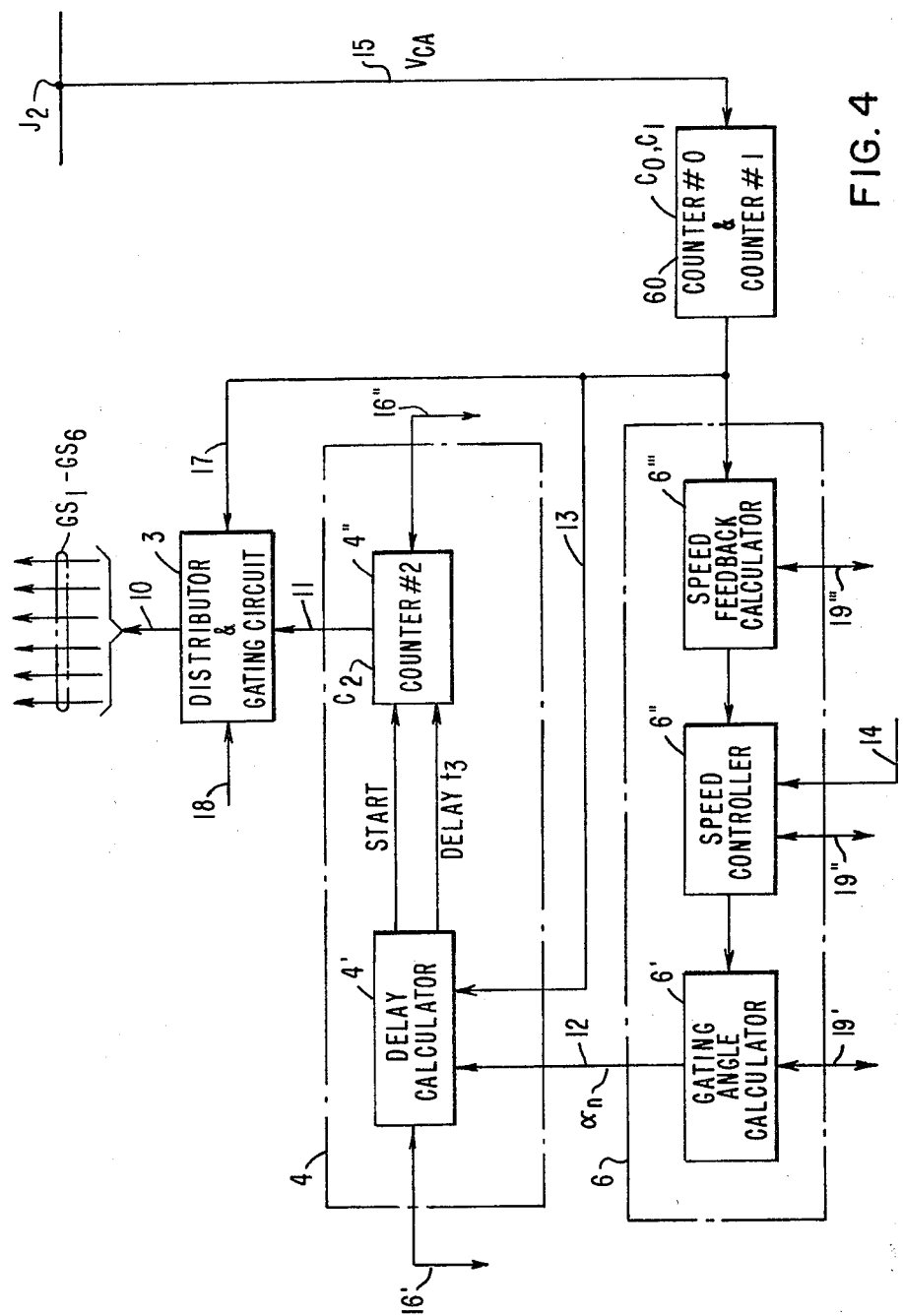
FIG. 4 is the preferred embodiment of the motor drive system of FIG. 1, namely in association with a microcomputer.

Referring to FIG. 4, the circuit diagram of FIG. 1 is shown with more detail regarding pulse triggering time generator 4 and speed and torque controller 6. Counters $C_0$ and $C_1$ schematically shown by block 60, respond to the zero crossings $Z_1$, $Z_n$ relative to $V_{CA}$ as sensed from junction $J_2$ and derived on line 15. Within speed and torque controller 6 are included the speed feedback calculator 6''', the speed controller 6'' and the gating angle calculator 6', which are under control from the microprocessor by 19''', 19'' and 19' respectively, in the dialogue between microprocessor 5 and controller circuit 6 (bus line 19 on FIG. 1). The gating angle calculator 6' outputs on line 12 the value $\alpha_n$. Pulse triggering time generator 4 includes a delay calculator 4' and counter $C_2$, within block 4'', which both are monitored and controlled, via 16' and 16'', respectively by microprocessor 5. Delay calculator 4' provides the count $t_3$ and starts counter $C_2$ at the end of time $t_2$ to initiate counting of the computed count, thus accumulating a real time $t_3$. When the count $t_3$ has lapsed, by line 11 the distributor and gating circuit 3 is triggered.

The hardware organization for performing the necessary computations upon each oncoming thyristor $T_{n-2}$, $T_{n-1}$, $T_n$, $T_{n+1}$, $T_{n+2}$ . . . successively, at each instant such as X, and for triggering a gating pulse when the calculated time interval $T_{c2p}$ has lapsed, is illustrated in block diagram in FIG. 3. From junction point $J_2$ and via line 15, the sensed line-to-line voltage signal is passed through the 90° phase shift filter 20. The positive and negative zero-crossing detectors 21 and 22 reset, by respective lines 25 and 26, counters $C_0$ and $C_1$, that is at 180° time interval from one another on the time scale. The data counts $t_{c0}$ and $t_{c1}$ at the rate of the clock signal of line 30 are addressed to the microprocessor by bus $B_2$ from counter $C_0$, by bus $B_3$ from counter $C_1$ onto a bus interface BI and by bus lines $B_7$ to the multibus system of a microprocessor module which comprises the microprocessor and its support equipment. The bus interface $B_1$ also communicates with counter $C_2$ by bus lines $B_4$, with an interrupt control circuit 35 by bus lines $B_5$, and counter $C_2$ is connected to interrupt control circuit by interrupt line 36. The clock signal of line 30 is also applied to counter $C_2$. Typically, the microcomputer employs a sixteen bit, high speed, bus compatible microprocessor. It also includes the necessary RAM and PROM memory, system interrupt, timers. The PROM stores the instructions set or program for the entire section system operation, including diagnostics. The microcomputer module is used not only for the computations involved in the gating pulse timing process according to the invention but also in connection with the speed and torque controller 6. Thus, besides the basic thyristor gating and protection, the PROM's are programmed to perform current regulation with limits; speed regulation; system sequencing; fault monitoring; diagnostics; and system communications. The systems information bus conforms electrically and mechanically to the proposed IEEE Standard 796, commonly referred to as Multibus ®.

Considering counter $C_2$ which recurrently is started at times $X_{n-2}$, $X_{n-1}$, $X_{n1}$, . . . for count down of the calculated count $t_{c2p}$, at instant $GP_{n-1}$ counter $C_2$ causes, via line 36, when it reaches zero an interrupt control circuit 35 to trigger, by bus line $B_5$, main bus $B_1$, and the multibus of the microprocessor, the latter to start the calculations for the next firing stage, $GP_n$. On the interrupt occurrence the gates of thyristor $T_{n-1}$ and $T_{n-2}$ (which are the pair of conducting thyristors before the incoming thyristor $T_n$ is to be gated) are enabled, provided no gate pulse suppression is called for. Immediately thereafter, as indicated by a hatched area on FIG. 2, the microprocessor makes the calculations which lead to the value $t_{c2p}$ of equation (3). In these calculations, the microprocessor first uses the 2's complement method to calculate $|t_{c0} - t_{c1}| = T_i/2$ in units of "TIME CLK" $t_1$, $t_2$, $(t_1+t_2)$ and finally $t_{c2p}$ is calculated. The value $t_{c2p}$ at instant $X_n$, based on the instantaneous value of $t_2$ given by running counter $C_0$, is immediately loaded in counter $C_2$ which starts counting down. Time interval $t_{c2p}$, thus, lapses concurrently with the count down until an instant at which $GP_n$ must be gated and for which $\alpha_n$ exists on the commutating voltage, as intended. At this very moment from interrupt control circuit 35, by bus $B_5$, main bus $B_1$ and bus $B_6$, the output register 27 is selected, and by line 11 onto the gate output drivers 3, the gating pulse generated by block 33 is applied through a corresponding line 10 onto gate $G_n$ of thyristor $T_n$. As in the afore-mentioned Detering patents, provision is made for a picket fence. To this effect, block 33 includes both a hard pulse generator and a picket fence generator supporting the ignition after the hard pulse has initiated it.

As is well known, when the motor is running at very slow speed, the line-to-line phase voltage $V_{CA}$ is very low in frequency and the magnitude of the voltage to be sensed for zero-crossing detection becomes so small that gate pulse phase control becomes impractical. The consequence is that at standstill, in the absence of the line voltage, the synchronous motor is unable to start itself. See H. Le-Huy, R. Perret and D. Roye in a paper entitled "Microprocessor Control of a Current-Fed Synchronous Motor Drive" presented on pages 873–880 in IEEE 1979, IAS79 Vol. 29A. As shown in this article, when not in the running mode, a microprocessor is used to start and accelerate the motor until the line-to-line phase voltage is sufficient, and during starting the thyristors are controlled under auxiliary pulse triggering in a forced commutation way. The Le-Huy, Perret and Roye article is hereby incorporated by reference to shown the state of the art. Referring now to FIG. 3 again, it is observed that when in the "pulse start mode," while counters $C_0$ and $C_1$ are not used, counter $C_2$ provides, from firing instant to firing instant, a time interval $T_g$ which represents the firing cycle through the succession of thyristors $T_{n-2}$, $T_{n-1}$, $T_n$, $T_{n+1}$, . . . A local oscillator generates pulses gating the thyristor at time intervals $T_g$ such that the frequency of occurrence is raised from a few hertz to a minimum frequency $f_m$ for which the line-to-line phase voltage is sufficient for the running mode to take over.

According to the present invention, the change in frequency during acceleratinon is based on a quasi logarithmic mode by keeping $\Delta f/f = K_1$ a predetermined constant percentage of the frequency, thereby to provide an increasing rate of acceleration. Therefore, from zero up to a minimum frequency $f_m$ acceleration will be accomplished by decreasing the gate-to-gate time interval $T_g$ by a constant amount $K_1$. In addition, still according to the present invention, from the frequency $f_m$ up to a maximum pulse mode frequency $f_M$, acceleration is accomplished by increasing the gate-to-gate time interval Tg so as to keep hertz/second acceleration constant equal to $K_2$, another constant. This will keep the torque requirement essentially constant in this range. $f_M$ will be sufficient to acquire a sync signal between motor and inverter in the running mode.

The implementation from zero to $f=f_m$ is based on the calculation by the microprocessor of Tg in accordance with the formula:

$$Tg_n = Tg_{(n-1)} \times K_1$$

Accordingly, the value $Tg_n$ is loaded into counter $C_2$ at instant $t_{n-1}$ which precedes by $Tg_n$ the incoming firing of $T_n$. Counter $C_2$ counts down and when it reaches zero by line 36 an interrupt occurs which as earlier explained will cause firing of $T_n$ by interrupt control circuit 35 and outer register 27. Since Tg is decreasing at each successive stage, the frequency of occurrence of the interrupts is increasing, and the motor, through inverter 2, is progressively accelerated.

When $f_m$ is reached, the algorithm $\Delta f/\Delta t = K_2$ for linear acceleration is applied, where $K_2$ is in hertz/sec. Thus, the change in frequency from the end of line cycle $(i-1)$ to the end of cycle $i$ would approximate $$\frac{\Delta f}{\Delta t} = K_2$$

$$\frac{f_i - f_{(i-1)}}{T_i} \cong K_2$$

where
- $f_i$ = average frequency during cycle $i$
- $f_{(i-1)}$ = average frequency during cycle $(i-1)$
- $T_i$ = period of cycle $i$ $$\left(\frac{1}{T_i} - \frac{1}{t_{(i-1)}}\right) / T_i \cong K_2$$

$$\frac{T_{(i-1)} - T_i}{T_i^2 T_{(i-1)}} \cong K_2$$

If $T_i$ and $T_{(i-1)}$ are not greatly different, then $$T_i^2 T_{(i-1)} \cong T_{(i-1)}^3 \qquad (4)$$

$$\frac{T_{(i-1)} - T_i}{T_{(i-1)}^3} \cong K_2$$

$$T_i \cong T_{(i-1)} - K_2 T_{(i-1)}^3$$

If the same logic is applied to gating intervals $Tg_n$ instead of the full line cycles, for linear frequency acceleration:

$$,(\Delta f/\Delta t) = K_2$$

equation (4) becomes:

$$\frac{\left(\frac{1}{6Tg_n} - \frac{1}{6Tg_{n-1}}\right)}{Tg_{n-1}} = K_2$$

$$\frac{Tg_{n-1} - Tg_n}{6Tg_n \cdot Tg_n Tg_{n-1}} = K_2$$

where
- $Tg_n$ = gate interval $n$
- $1/6Tg_n$ = average frequency during interval $Tg_n$ in Hz.

Therefore, the algorithm is:

$$Tg_n \cong Tg_{(n-1)} - 6K_2 Tg_{(n-1)}^3$$

where $K_2$ is Hz/sec. and Tg is in seconds.

Pulse mode control in the linear acceleration stage is illustrated by the following example where the initial condition is:

$$Tg_o = 0.0833 \text{ sec. (2 Hz)}$$

The following acceleration steps obtain:

| n | | $Tg_n$ for $K_2 = 2$ Hz/sec. | |
|---|---|---|---|
| 0 | 2 Hz | .0833 | ⎫ 8.3% |
| 1 | | .0764 | ⎭ |
| 2 | | .0710 | |
| 3 | | .0667 | |
| 4 | | .0632 | |
| 5 | | .0601 | |
| 6 | | .0575 | |
| 7 | 3 Hz | .0553 | |
| 8 | | .0533 | ⎫ 1.00 sec. |
| 9 | | .0514 | |
| 10 | | .0489 | |
| 11 | | .0483 | |
| 12 | | .0470 | |
| 13 | | .0457 | 0.5 sec |
| 14 | | .0445 | |
| 15 | | .0435 | |
| 16 | | .0425 | |
| 17 | 4 Hz | .0416 | ⎭ |
| 18 | | .0407 | |
| 19 | | .0399 | |
| 20 | | .0391 | |
| 21 | | .0384 | |
| 22 | | .0377 | ⎫ <2% |
| 23 | 4.5 Hz | .0371 | ⎭ |
| 24 | | .0365 | |

This verifies that operation with the afore-stated mathematical expressions predicting $Tg_n$ based on $Tg_{(n-1)}$ can be performed with sufficient accuracy.

The following is indicative of a practical method of calculation in the pulse, or acceleration mode, for a synchronous motor drive.

Initially any pair of gates are fired. Also the DC link current is set initially to 60%, and the other current $I_F$ is set at a fixed value, typically 50%. The initial gate interval Tg is loaded into counter $C_2$, and counter $C_2$ counts down to zero. The interrupt occurs. Starting at 0.5 hz, the initial value $t_{c20}$ is $$t_{c20} = \left(1/6 \cdot \frac{1}{f_o}\right) / \frac{1}{f_{clk}}$$

$$= \frac{1}{6(0.5)} \cdot f_{clk} = .33 f_{clk}$$

The clock signal of the oscillator OSC being at 100 kHz, then, $$t_{c20} = (0.33)(100 \text{ kHz}) = 33,000$$

When the interrupt occurs, the current reference is set to zero, the "commutating" flag is set, and the counter $C_2$ is set to the commutating interval Tg (10 msec). Thus:

$$t_{c2com} = 10 \text{ msec} \frac{1}{f_{clk}} = .01 \times f_{clk} = 1000$$

On the next interrupt, the "commutating" flag is found to be set. Another routine is used this time to set a new gate pattern for the inverter and initiate the hard pulse. The DC link current reference is set to 60%. The "commutating" flag is reset, and counter $C_2$ is set to the next gating interval Tg. The interval for both "logarithmic" and linear modes is calculated and the longer one of the two intervals is loaded into counter $C_2$.

For the "logarithmic" calculation, the method consists in effecting the multiplication $$Tg_{n-1} \times K_1 = Tg_n$$

where $Tg_{n-1}$ and $Tg_n$ are 16-bit integers, $K_1$ is a 16-bit "fraction," typically in the range 0.900 to 0.999. Since $K_1$ is always positive, an unsigned integer multiplication becomes most convenient. The result would be in the upper 16-bit answer.

With a linear approach, or "ramp" acceleration in the pulse mode, the method of calculation can be:

$$Tg_n = Tg_{n-1} - 6K_2(Tg_{n-1})^3$$

$$Tg_{n-1} \times Tg_{n-1} = (Tg_{n-1})^2$$

$$(Tg_{n-1})^2 \times Tg_{n-1} = (Tg_{n-1})^3$$

The signed integer is multiplied with the answer in the 16 MSB of the result:

$$(Tg_{n-1})^3 \times K_2 \times 6 = \Delta Tg_n$$

Here, the signed integer is multiplied twice with the answer in the 16 LSB and finally, $$\Delta Tg_{n-1} + Tg_{n-1} = Tg_n$$

which involves a simple addition.

APPENDIX ON THE NORMAL RUNNING MODE

Speed Feedback Calculations
Line sync counters $C_0$ and $C_1$ per FIGS. 3 and 4.

$$|C_1 - C_0| = T_L/2$$

where $T_L$ is the line period in clock cycles (100 kHz clock).

If line frequency $f_1$ varies from 2 to 70 Hz, the value $|C_1 - C_0|$ will vary from $\frac{1}{2} \cdot 1/70$ to $\frac{1}{2} \cdot \frac{1}{2}$ seconds which, at 100 kHz, is 714 to 12,500 counts.

For a good resolution 11 bits of resolution are used after dividing 714 into a constant assuming the binary 2's complement mathematical method is used with a 16 bit processor. Suppose we divide period (10–15 bits) into a 25 bit constant. The answer would be 15–10bits, which is the resolution that can be measured (no loss of precision in the divide).

Use $12.800 \times 10^6$ as constant $K_s$, then:

$$f_L = \frac{1}{T_L} = \frac{K_s}{|C_1 - C_0|} \text{ ; or:}$$

$$\frac{12.800 \times 10^6}{714.3} = 17920 = 70 \times 256$$

(The answer is in $Hz \times 2^8$)

At 4 Hz: $\frac{12.8 \times 10^6}{12,500 \text{ counts}} = 1024 = 4 \times 256 \text{ (Hz} \times 256)$ $12.8 \times 10^6$ is $00C35000H$ Method of Calculation for $t_{c2p}$ calculation
(Using the 16-Bit 2's Complement)

In order to keep $$\frac{a_n}{180°} + \left(\frac{\phi_n}{180°} - \frac{1}{2}\right)$$

less than 1, each of the fractions is divided by 4 before multiplying $$\left(\frac{a_n}{180°} - \frac{1}{2} + \frac{\phi_n}{180°}\right) \times |t_{c0xn} - t_{c2xn}|$$

It remains to multiply by 4 to get correct scaling, before subtracting $t_{clxn}$.
Then, $$t_3 = t_{c2p} = \left[\left(\frac{1}{4} \cdot \frac{a_n}{180°} + \frac{1}{4}\left(\frac{\phi_n}{180°} - \frac{1}{2}\right)\right) \times |t_{c0xn} - t_{c1xn}|\right] \times 4 - t_{c0xn}$$

where
$(a_n/180°)$ is the output from the speed and torque controller, with a range from 0 to 1, and
$(\phi_n/180° - \frac{1}{2})$ is constant for each gate with a range from $-\frac{1}{2}$ to $+1-\frac{1}{2}$. $|t_{clxn} - t_{c2xn}|$ must be $\leq \frac{1}{2} \times 7FFF_4$ if we use 16-bit counters and we do not want the sign of the counter to change. Then $t_{c0xn}$ will be $< 7FFF_4$ also, since $$t_{c0(max)} \leq 2|t_{c0xn} - t_{clxn}| = T$$

minimum frequency which can be handled:

$$t_{c0} \leq T = 1/f \leq 7FFF_4 \times \Delta t$$

where $\Delta t$ = period of time clock.
If $\Delta t = 10.0$ usec:

$T \leq 7FFF_4 \times 10.0$ μsec $= 32767 \times 10.0$ μsec $= 0.3277$ sec $f_{min} = 1/T_{max} = 3.05$ Hz.

This is acceptable.

APPENDIX ON THE PULSE MODE

A typical example:

1 second = $186A0H$ (in units of $(1/10^5)$ second)

Let $K_2 = 2$ Hz/sec $= 2$ cyc/sec$^2 \cdot \left(\dfrac{1 \text{ sec}}{10^5 \text{ clocks}}\right)^2 =$ $$\dfrac{2}{10^{10}} = \dfrac{2}{(2.32 \times 2^{32})} \dfrac{\text{cyc}}{\text{clock}^2}$$

At 6 Hz, $Tg = \dfrac{1}{6} \times \dfrac{1}{6} \times 100,00° = 2777$ counts $Tg^2/2^{16} = 117.73 \ (=117)$ $(Tg^2/2^{16}) \cdot Tg/2^{16} = Tg^3/2^{32} = 4.98 \ (=4)$ $6 \times K_2 \times Tg^3 = 6 \times \dfrac{2}{2.32 \times 2^{32}} \times Tg^3 = \dfrac{6 \times 2}{2.32} \times \dfrac{Tg^3}{2^{32}}$ $= 5.7 \times 4.98 = 25.8 \ (=5 \times 4 = 20)$ $\dfrac{25.8}{2777} = 0.929\%$ change from previous gate interval.

It is expected that at 6 Hz, Tg=1/36 second and at 2 Hz/sec accel:

$2$ Hz/sec $\times \dfrac{1}{36}$ sec $= \dfrac{1}{18}$ Hz change per gate interval $\dfrac{1/18 \text{ Hz}}{6 \text{ Hz}} = .926\%$ change in frequency per gate interval Let 0.25 seconds = 186AOH = $10^5$
This multiplies Tg values by 4.
Then $K_2$ must be divided by $(\frac{1}{4})^2 = 1/16$
The calculation now becomes:

$Tg_{n-1} \times 4 = 4Tg_{n-1}$

This involves a ±15 bit multiplication and the answer is in 16 LSB $4Tg_{n-1} \times 4Tg_{n-1} = (4Tg_{n-1})^2$ $4Tg_{n-1} \times 4Tg_{n-1}^2 = (4Tg_{n-1})^3$ Here, ±15 bit is multiplied by the answer in 16 MSB (namely dividing by $2^{16}$ each multiplication step).

$6 \times (K_2/16) = 6 \times \dfrac{2}{2.32 \times 2^{32} \times 16} = \dfrac{.323}{2^{32}}$ $(4Tg_{n-1})^3 \times 0.323 = \Delta Tg_n$ Now there is a ±15 bit multiply, answer in 16 MSB (0.323 based on 7FFF=1).

$Tg_{n-1} + \Delta Tg_n = Tg_n$

This involves a simple addition. The answer is in clock times × 4.

The total involves four multiplies and one addition. Even at 6 Hz, several multiplications will not require much time. There is at least a 30 millisecond time interval per gate in the pulse mode.

In the pulse mode, the only counter required is the 60° delay between pulses. From the above calculation,
Pulse Mode: $f_{min} = 3.05/6 = 0.5086$ Hz
This is good enough, because the plan is to start at 0.5 Hz. but the frequency could go down to $f_{min} = 0.5086/2 = 0.2543$ Hz because all 16 bits could be used for the delay (no sign).

We claim:
1. A method of establishing the instant of firing a selected one of an array of thyristors in coincidence with a predetermined firing angle relative to a variable frequency AC line voltage comprising the steps of:
   deriving in relation to said AC line voltage with a first counter operative at a predetermined counting rate a first recurrent count initiated upon the occurrence of one zero crossing of said line voltage;
   deriving in relation to said AC line voltage with a second counter operative at said predetermined counting rate a second recurrent count initiated upon the occurrence of the opposite zero crossing of said line voltage;
   effecting the difference between said first and second recurrent counts to derive in terms of said predetermined counting rate a difference count representing 180 electrical degrees;
   initiating with a computer a calculation based on said difference count and involving one of said recurrent counts, the phase shift between a reference line voltage related to said AC line voltage and the commutating voltage of the thyristor "next" to be fired to derive at the end of said calculation a calculated count in terms of said predetermined counting rate which is representative of the number of electrical angles left therefrom before reaching in time said firing angle;
   presetting with said calculated count a third counter operative at said predetermined counting rate;
   counting down with said third counter from said preset calculated count to zero; and
   firing said "next" thyristor when said last counting down reaches zero.

2. The method of claim 1 with said calculation being based on the formula $t_{c2p} = a_n \cdot (T_i/360°) - (t_1 + t_2)$ where
   $t_{c2p}$ is the instantaneous count of said third counter;
   $t_2$ is the instantaneous count of said first counter;
   $t_1$ is the count of 90° electrical angle less the phase shift between said reference line voltage and said commutating voltage of the "next" thyristor.

3. The method of claim 1 with said thyristor being part of a six-phase thyristor bridge, and said line voltage being part of a three phase AC power supply;
   said third counter counting down to zero being repeated at a 60° electrical angle in succession from thyristor to thyristor with said third counter, thereby to fire said thyristors in succession with said calculated count.

4. The method of claim 1 with said difference effecting step using the 2's complement method with said first and second counter recurrent counts.

5. The method of claim 1 with said thyristor being part of a statically controller current-fed inverter system coupled to an AC motor drive including a synchronous motor;
   with said synchronous motor being started in the pulse mode;
   the steps of accelerating the motor from frequency zero at time zero to a minimum frequency $f_m$ being performed with said calculation in accordance with the formula:

$$Tg_n = Tg_{(n-1)} \times K_1$$

where $K_1 = \Delta f/f$ is a constant percentage of decrease of the gate-to-gate interval $T_g$, the new value $Tg_n$ being calculated by said computer and said third counter being preset by such new calculated amount $Tg_n$ after each countdown.

6. The method of claim 5 with the accelerating steps being performed beyond $f = f_m$ and up to a maximum frequency $f_M$ and accomplished with calculations based on the formula:

$$Tg_n = Tg_{n-1} - 6K_2 Tg(n-1)^3$$

where $K_2 = \Delta f/\Delta t$ in Hz/sec. and $T_g$ in sec.

* * * * *